US008625750B2

(12) United States Patent
Gravino et al.

(10) Patent No.: US 8,625,750 B2
(45) Date of Patent: Jan. 7, 2014

(54) CALL SCREENING FOR VOICEMAIL

(75) Inventors: Douglas David Gravino, Roswell, GA (US); Radhakrishnan Gopinath, Alpharetta, GA (US); Michael Lee Poffenberger, Sandy Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/011,496

(22) Filed: Jan. 21, 2011

(65) Prior Publication Data

US 2012/0163566 A1 Jun. 28, 2012

Related U.S. Application Data

(60) Provisional application No. 61/427,073, filed on Dec. 23, 2010.

(51) Int. Cl.
*H04M 1/64* (2006.01)
(52) U.S. Cl.
USPC ................ 379/88.11; 379/88.12; 379/142.16
(58) Field of Classification Search
USPC ........... 379/67.1, 68, 70, 88.12, 88.22, 88.23, 379/88.25, 88.11, 142.16
See application file for complete search history.

(56) References Cited

U.S. PATENT DOCUMENTS

| 5,894,504 | A  | * | 4/1999  | Alfred et al. ................ 379/88.13 |
| 6,661,886 | B1 | * | 12/2003 | Huart et al. ............... 379/215.01 |
| 7,035,385 | B2 | * | 4/2006  | Levine et al. .............. 379/88.23 |
| 7,103,167 | B2 | * | 9/2006  | Brahm et al. ............ 379/211.02 |
| 7,158,619 | B2 | * | 1/2007  | Simpson ..................... 379/88.22 |
| 7,359,495 | B2 | * | 4/2008  | Chan et al. ............... 379/201.01 |
| 8,223,757 | B2 | * | 7/2012  | Jackson et al. ................ 370/356 |
| 2004/0202291 | A1 | * | 10/2004 | Skinner ........................ 379/67.1 |
| 2005/0025295 | A1 | * | 2/2005  | Christie ..................... 379/88.19 |
| 2006/0025114 | A1 | * | 2/2006  | Bales et al. .................... 455/413 |
| 2009/0210917 | A1 | * | 8/2009  | Lafreniere et al. ............ 725/106 |

* cited by examiner

*Primary Examiner* — Olisa Anwah
(74) *Attorney, Agent, or Firm* — Merchant & Gould

(57) ABSTRACT

Allowing a user of a communication device to have real-time control as a voicemail is being generated is provided. An incoming call to a communication device may be sent to voicemail; however, rather than waiting for the message to be deposited into the voicemail system followed by subsequent retrieval, a user of the called communication device/called party may have an option to listen to the message as it is being created and stored. During the process of listening in on the message being deposited in the voicemail system, the user/called party may have options in real-time to take the call, ignore the call, listen to the call, and the like. Alternatively, the user/called party may take the call (answer) as the voicemail is being deposited without listening in on the voicemail as it is being deposited.

34 Claims, 8 Drawing Sheets

CALL SCREENING FOR VOICEMAIL

CROSS REFERENCE TO RELATED APPLICATIONS

The present application claims priority to U.S. Provisional Patent Application No. 61/427,073 filed Dec. 23, 2010, the disclosure of which is hereby incorporated by reference in its entirety.

BACKGROUND

Various technologies exist for recording a message when a user is unwilling or unavailable to answer a phone call including voicemail systems and answering machines. Voicemail is a centralized system for managing telephone messages and conveying voice messages. Voicemail has become a ubiquitous feature on phone systems serving companies, wireless, and residential subscribers. Wireless and residential voicemail systems are used primarily as simple telephone answering systems. With virtually all wireless communication, a voicemail service is employed by users for storing and retrieving calls when the called party is unavailable to take a call, or chooses not to take a call.

In today's electronic and mobile environment, it is common for a user to utilize voicemail as a call-screening mechanism. For example, if the user receives a call while in a meeting and does not want to be disturbed, the user may select a command to send the call directly to voicemail or ignore the call altogether and let the call be directed automatically to voicemail after a number of rings and listen to a saved message later. For another example, when the user does not recognize the incoming calling party's number and does not wish to answer a call from an unknown calling party, the user may send the call directly to voicemail.

As mentioned, traditional answering machines may also provide for recording a message when a user is unwilling or unavailable to answer a phone call. Traditional answering machines may also provide for a call-screening mechanism. For example, the user may listen in on the incoming message as the caller is leaving the message, and optionally answer the call to have a live conversation. As can be appreciated by those skilled in the art, call-screening is a useful tool and is often employed for some of the reasons mentioned above to mention just a few. While the call-screening methods mentioned above are certainly useful for call-screening, current voicemail systems do not allow for real-time control of a call while a voicemail is being created.

It is with respect to these and other considerations that the present invention has been made.

SUMMARY

Embodiments of the present invention solve the above and other problems by allowing a user of a communication device to have real-time control as a voicemail is being generated. According to embodiments, an incoming call to a communication device may be sent to voicemail; however, rather than waiting for the message to be deposited into the voicemail system followed by subsequent retrieval, a user of the called communication device/called party may have an option to listen to the message as it is being created and stored. During the process of listening in on the message being deposited in the voicemail system, the user/called party may have options in real-time to take the call, ignore the call, listen to the call, and the like. Alternatively, the user/called party may take the call (answer) as the voicemail is being deposited without listening in on the voicemail as it is being deposited.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1A:
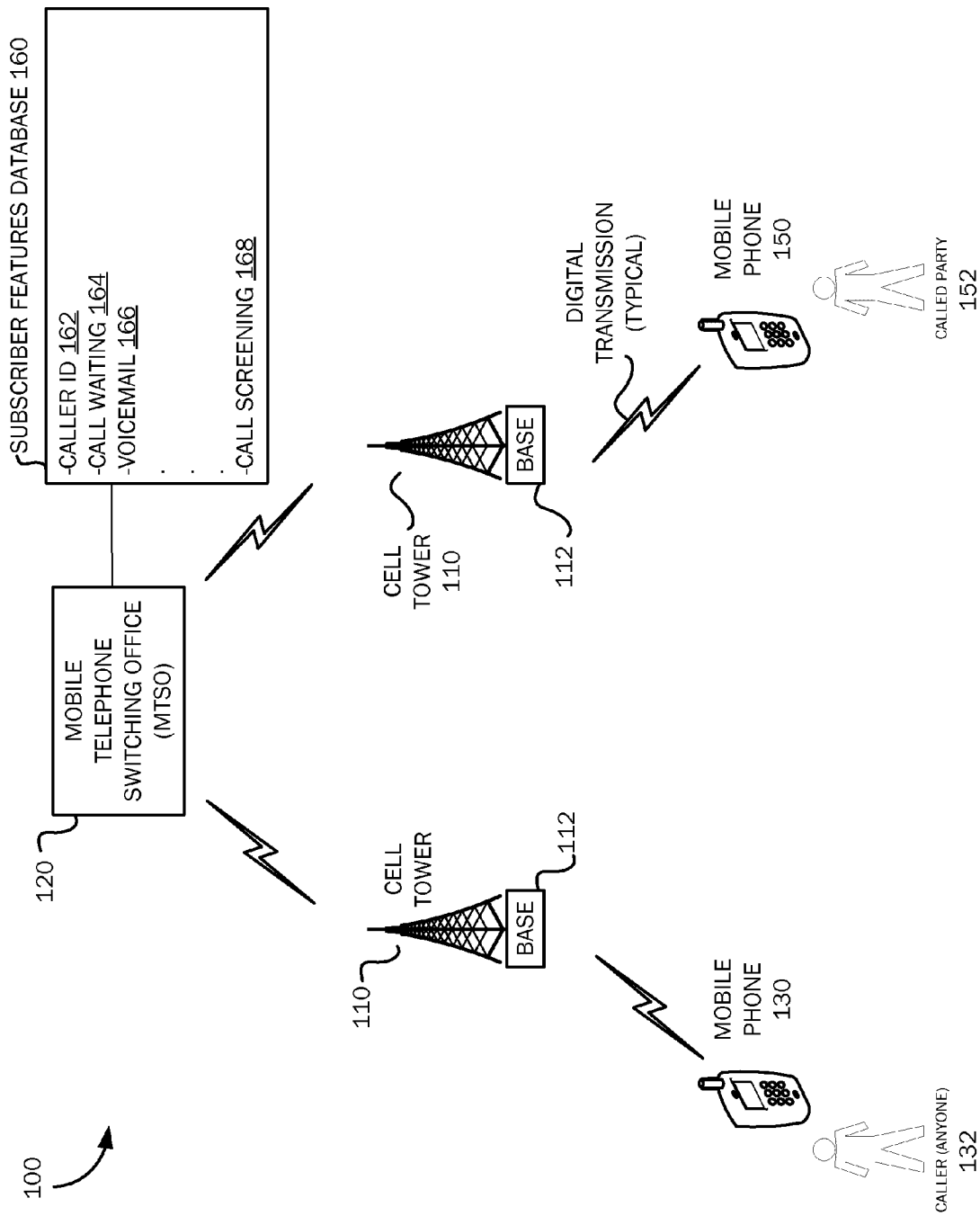
FIG. 1A is simplified block diagram illustrating a wireless communications network architecture that serves as an exemplary operating environment for the present invention.

As briefly described above, embodiments of the present invention are directed to allowing a user of a communication device to have real-time call-screening capability for voicemail messages generated for the user. As will be described below, a user of a communication device may provision a real-time call-screening feature for allowing the called party to "listen in" as voicemail is being created by a calling party and for allowing the called party to exercise control over the associated incoming call when desired. That is, when an incoming call is passed to a voicemail system, the called party may exercise various call control options, such as listen in only, take or pick-up the call in the midst of voicemail generation, allow the message to go to voicemail, and the like.

Embodiments of the present invention provide for allowing call screening of a voicemail message in a telephone system, wherein a call directed to a communication device may be routed to a voicemail system associated with the communication device; an indication that the call directed to the communication device is being routed to the voicemail system associated with the communication device is presented at the communication device; a voicemail message associated with the call is received at the voicemail system; an indication to listen to the voicemail message is received at the voicemail system as the voicemail message is being received at the voicemail system; in response to receiving an indication to listen to the voicemail message received at the voicemail system as the voicemail message is being received at the voicemail system, an extension to the called communication device may be added to establish a three-way bridge between a calling party, the called communication device, and the voicemail system; and the microphone of the called communication device may be muted.

Consider, for example, a user receives a call on his wireless device from a number that he/she may not recognize. Instead of answering the call, he/she decides to route the call to his/her voicemail. He/she may then decide to listen in on the voicemail as it is being left. Accordingly, he/she selects an option on his/her wireless phone to listen in on the voicemail.

A communication switch associated with the wireless phone may then set up a three-way call between the caller, the called device, and the voicemail platform so that the user of the called device may listen in on the voicemail as it is being received at the voicemail system. The microphone of the user's device may be muted so that the caller does not know that the voicemail is being screened.

Other embodiments provide for allowing call screening of a voicemail message in a telephone system, wherein: a call directed to a communication device is received; an indication to route the call to a voicemail system associated with the communication device and an indication to allow a user of the communication device to listen to the voicemail message routed to the voicemail system associated with the communication device is received; in response to receiving an indication to route the call to a voicemail system associated with the communication device and receiving an indication to allow a user of the communication device to listen to the voicemail message routed to the voicemail system associated with the communication device, a three-way bridge between a calling party, the called communication device, and the voicemail system is established; and the microphone of the called communication device is muted.

Consider, for example, a user receives a call on his/her phone. Instead of answering the call, he/she decides to route the call to his/her voicemail and additionally, to listen in on the voicemail as it is being left. He/she may select an option provided on his/her phone to send the voicemail and to listen in. Upon receiving the user's selection, the communication switch may establish a three-way call between the calling party, the called phone, and the voicemail system. The microphone of the user's device may be muted so that the caller does not know that the voicemail is being screened.

According to embodiments, after a three-way bridge is established between a calling party, the called communication device, and the voicemail system, an indication may be received to answer the call at the communication device. In response to receiving an indication to answer the call at the communication device, the voicemail system extension of the three-way bridge may be dropped, and the microphone of the called communication device may be unmuted.

For example, a user receives a call, routes the call to his/her voicemail, and listens in on the voicemail as it is being left like in the previous two examples. While the user is listening to the voicemail as it is being left, he/she decides to answer the call. He/she may select an option on his/her phone to answer the call, wherein the voicemail system leg of the three-way call may be dropped, the microphone of the called user's phone may be turned on, and he/she may communicate with the caller.

Other embodiments provide for allowing call screening of a voicemail message in a telephone system, wherein: a call directed to a communication device is received; the call directed to the communication device is routed to a voicemail system associated with the communication device; an indication is presented at the communication device that the call directed to the communication device is being routed to the voicemail system associated with the communication device; a voicemail message associated with the call is received at the voicemail system; an indication to answer the call at the communication device is presented at the communication device, and in response to receiving an indication to answer the call at the communication device, the call is routed back to the communication device, and the routing of the call to the voicemail system may be terminated.

Consider, for example, a user receives a call on his/her phone. He/she is not able to get to his/her phone in time to answer the call, and the call is routed to his/her voicemail. He/she may receive an indication on his/her phone that the call is being routed to his/her voicemail. The user may select an option provided on his/her phone to answer the call while the voicemail is being left without listening in on the voicemail. The call may then be routed back to the user's phone, the routing of the call to the voicemail system may be terminated, and the user may communicate with the caller.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1A is simplified block diagram illustrating a wireless communications network architecture that serves as an exemplary operating environment for the present invention. As should be understood, the example wireless communications network architecture illustrated in FIG. 1 is for purposes of example and is not limiting of a variety of communications configurations that may be utilized as described herein. Embodiments of the present invention may be utilized in various communications networks including, but not limited to, public switched telephone network (PSTN) systems, Central Exchange (Centrex) systems, private branch exchange (PBX) systems, and software-based voice over Internet protocol (VoIP) phone computer systems, and the like. Referring now to FIG. 1A, wireless communications services are provided by various service provider companies through a wireless network 100. As is known to those skilled in the art, wireless networks may consist of but not be limited to cellular towers 110, base stations 112, and a Mobile Telephone Switching Office (hereafter referred to as "MTSO") 120.

As is known to those skilled in the art, a cellular tower 110 typically consists of a steel pole or lattice structure outfitted with antennae for transmitting and receiving signals to and from wireless devices (for example, mobile phone, personal digital assistant (PDA), smart phone, etc.), other cellular towers, and the MTSO. Each cellular tower 110 may have multiple sets of antenna mounted, depending upon how many different service providers use the tower 110. As should be appreciated, a variety of other cellular tower 110 configurations may be utilized. For example, antennae and associated transmitters and receivers may be mounted in other ways, such as on building tops or on mobile stations.

The base 112 of each cellular tower 110 includes sets of transmitters and receivers from each service provider having antennae mounted to the tower 110. As a unit, the cellular tower 110 and the base 112 form a system capable of transmitting, receiving, and managing data. This data may consist of, but not be limited to, voice, text, and/or electronic media. As is understood by those skilled in the art, wireless systems typically operate at various frequencies (e.g., across a frequency range from 700 megahertz (MHz) to 2100 MHz), depending upon which wireless technology is utilized. According to embodiments of the present invention, call forwarding indication may operate across this typical network of wireless systems, and therefore in the same frequency ranges.

Referring still to FIG. 1A, a wireless network may also employ the use of a wireless electronic communication device 130, 150 (e.g., mobile phone, personal digital assistant (PDA), smart-phone, etc.) capable of sending and receiving data in the same frequency range as the wireless communications system. The term "wireless device" will be used herein to describe a mobile wireless electronic communications device capable of sending and receiving electronic communications. As is understood by those skilled in the art, a wireless device 130, 150 comprises, but is not limited to, an internal circuit board, antenna, operating system software, liquid crystal display (LCD), keyboard, microphone, speaker, and a battery. All of these components and systems making up a wireless device 130, 150 work together to send, receive, and manage data within and beyond the cellular network.

Referring still to FIG. 1A, communication switch, such as an MTSO 120 serves as a central control center for the base stations 112 operating in a given area. For example, an MTSO 120 may be configured for controlling wireless communications for a wireless service provider operating in a specified city or other suitable operating area or region. In addition to other operating functions of the MTSO, according to embodiments of the present invention, the communication switch (e.g., MTSO 120, etc.) may serve as a control point for determining, providing and controlling subscriber features. For example, in accordance with embodiments of the invention, a customer information database 160 may contain data to allow a determination as to whether a particular feature or service is provisioned for a given wireless communications device account. An example of such a feature or service may be Caller ID 162, Call Waiting 164, Voicemail 166, or Call Screening 168.

If a called party using a wireless device is authorized to have call-screening 168, the feature may be provisioned at the MTSO on the called party's wireless device. When communications are received at the MTSO for routing to the called party's wireless device, the communications may be routed first to the called party's wireless device to allow the called party to exercise certain controls over the communication. Examples of such controls include, but are not limited to, allowing the communication to proceed, i.e., answering the call; causing the communication to forward to voicemail; causing the communication to forward to voicemail and allowing the called party to listen in on the message being left in real-time, and if desired, allowing the called party to take or pick-up the call as the message is being left.

As described, when a communication is directed to a user of a wireless device, the called party may select one of a number of such communication processing options. Upon selection of a desired option, the selected option is transmitted from the called party's wireless device 150 back to the MTSO, and the MTSO processes the communication from the calling party to the called party accordingly. As should be appreciated, although described above relative to a wireless communications network, embodiments of the present invention may be implemented in any communications network wherein a communications device has the capability to receive a phone call, present call disposition options to a user, receive commands from the user (e.g., button press to send a call to voicemail, etc.), and send commands to a communication switch, Additionally, embodiments of the present invention may be implemented in a communications network wherein the communication switch has the capability to receive a call directed to a communication device; route the call directed to the communication device to a voicemail system associated with the communication device; present at the communication device an indication that the call directed to the communication device is being routed to the voicemail system associated with the communication device; receive an indication to allow a user of the communication device to listen to the voicemail message received at the voicemail system as the voicemail message is being received at the voicemail system; in response to receiving an indication to listen to the voicemail message received at the voicemail system as the voicemail message is being received at the voicemail system, establish a three-way bridge between a calling party, the called communication device, and the voicemail system by adding an extension to the called communication device; receive an indication to allow the user of the communication device to answer the call at the communication device while the voicemail message is being received at the voicemail system; and in response to receiving an indication to answer the call at the communication device, drop the voicemail system extension of the three-way bridge.

Figure 1B:
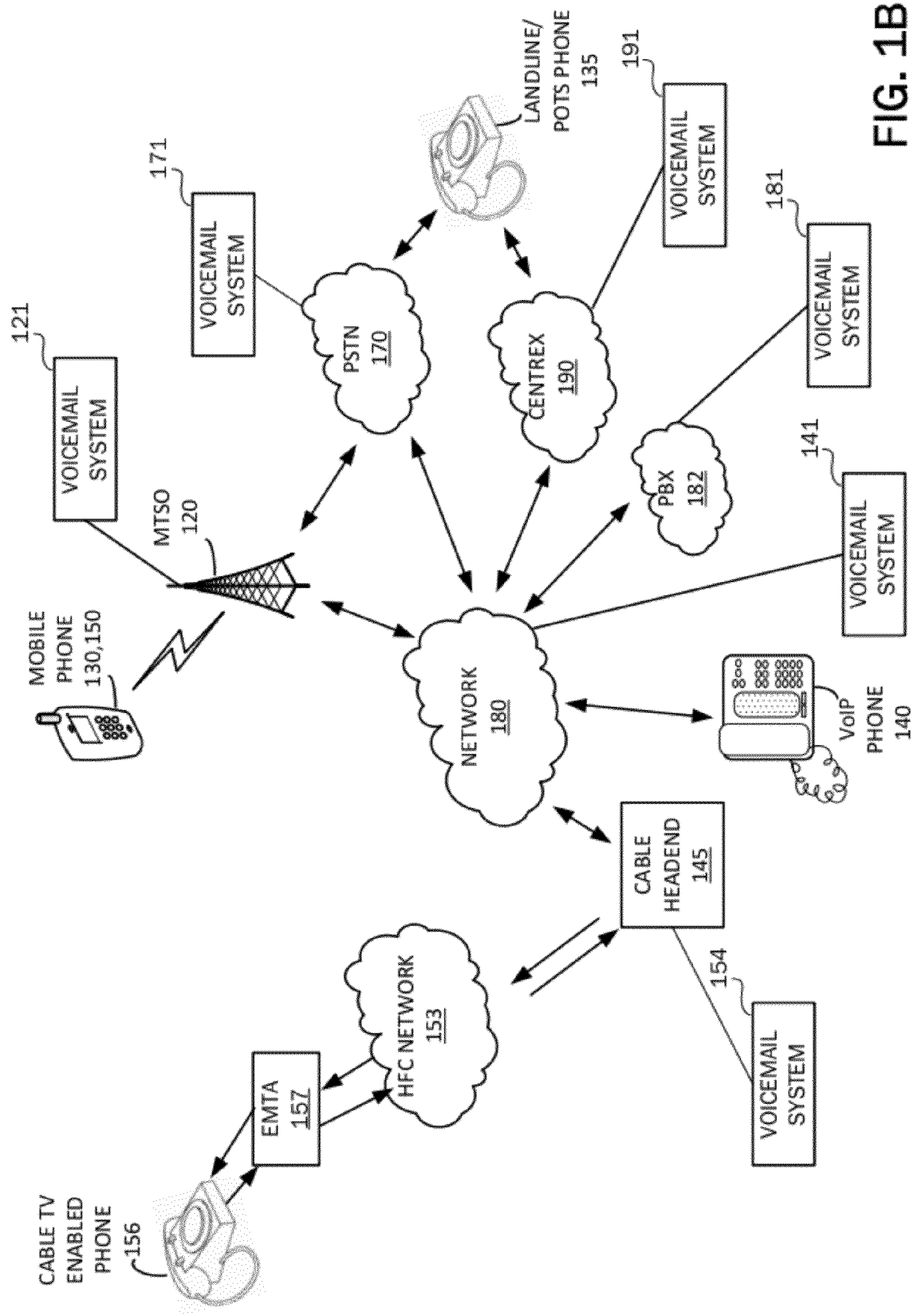
FIG. 1B is a simplified block diagram illustrating various communication network architectures that serve as an exemplary operating environment for the present invention.

As described briefly above and as shown in FIG. 1B, embodiments of the present invention may be utilized in various communications networks including, but not limited to, public switched telephone network (PSTN) systems 170, Central Exchange (Centrex) systems 190, private branch exchange (PBX) systems 182, and software-based voice over Internet protocol (VoIP) phone computer systems 140, and the like. A wireless network 120 may connect to a public switched telephone network (PSTN) 170 and/or may connect to a packet-switched network (such as the Internet) 180 via a wireless network gateway. Plain old telephone system (POTS) and wireline telephones 135 may connect to a wireless network 120 and/or the Internet 180 via a public switched telephone network (PSTN) 170. Personal computers may connect to packet-switched network 180 for various communications, such as voice, e-mail, messaging, faxing, etc. As should be appreciated, transmission technologies for delivery of voice and/or data communications over IP networks 180 such as the Internet or other packet-switched networks is a known technology to those skilled in the art and will not be discussed in extensive detail herein.

According to embodiments, telecommunications may also be routed to CATV devices, such as a CATV-enabled telephone 156. A CATV-enabled telephone 156 may send and receive communications via a cable modem operative to pass cable telephony communications or via a voice over Internet protocol (VOIP) adapter operative to pass Internet protocol (IP) based communications to the telephone 156. According to one embodiment, the cable modem and VOIP adapter may be implemented in a single device known as an embedded multimedia terminal adapter (EMTA) 157.

According to embodiments, both a STB and a CATV-enabled telephone 156 may be operative to send and receive telecommunications. According to an embodiment, a database may be queried for UIN and MAC address association information so a determination may be made as to which STB may be associated with which phone number. In the case of the telephone 156, communications may be passed through the EMTA 157 and through the head end via the HFC network 153 or directly from the EMTA via Internet communications transports.

A voicemail system 121,171,191,181,141,154 is a system operative to generate, store and manage audio messages as described herein. The voicemail system may comprise a server, which is a general-purpose computing system operative to assemble and manage data sent to and received from the various communications networks such as Internet 180 communication links, publicly switched telephone circuits, wireless communications circuits, cable communications circuits, satellite communications circuits and the like. Although shown as separate systems, voicemail systems 121,171,191, 181,141,154 may be a single system, or may alternatively be separate systems. Hereafter, the term voicemail system will be used to indicate any voicemail system illustrated in FIG. 1B. Additionally, the term communication switch will hereafter be used to indicate any communications switch in any communications network illustrated in FIG. 1B.

Figure 2:
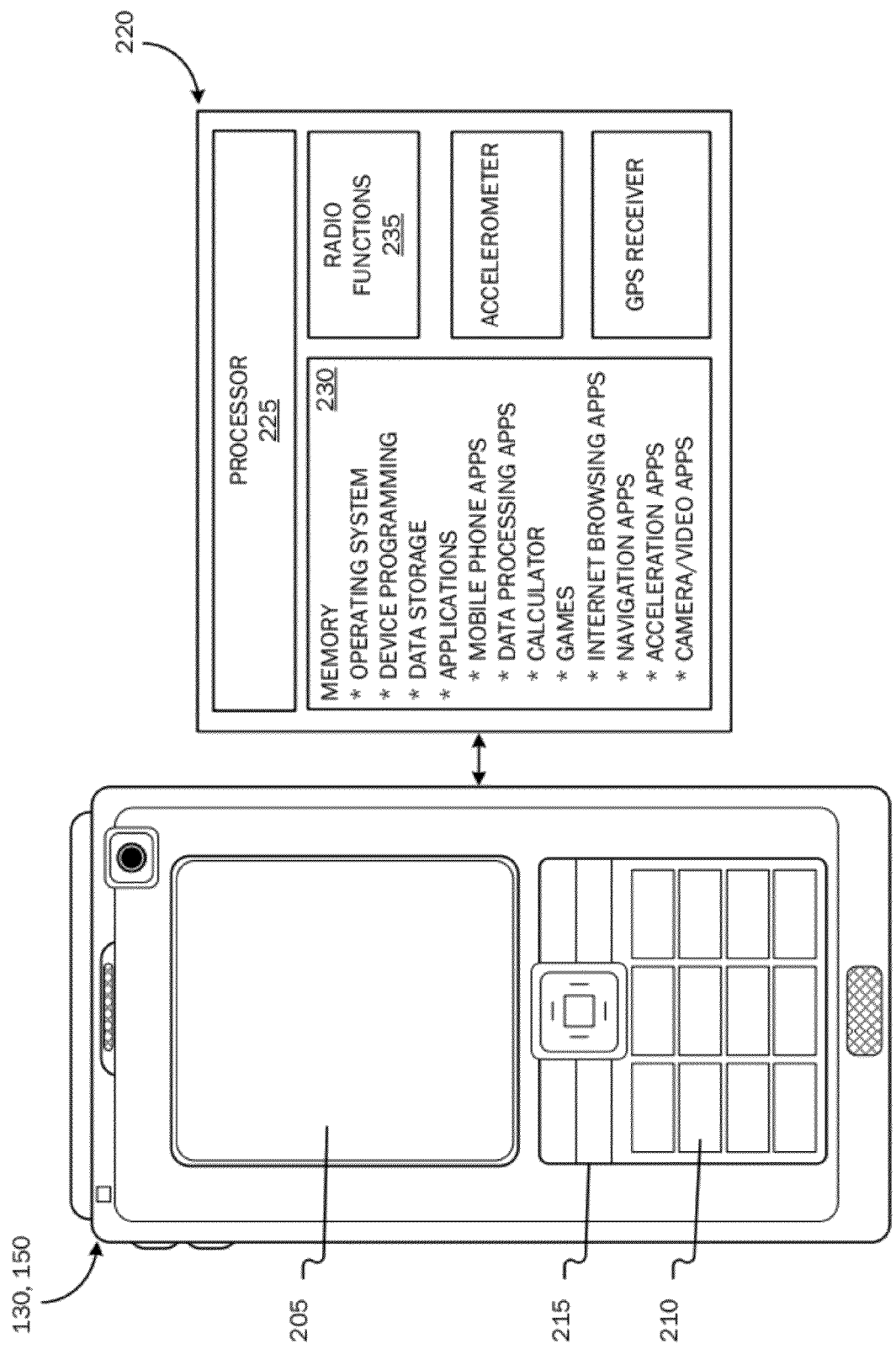
FIG. 2 is a simplified block diagram illustrating a mobile telephone/computing device with which embodiments of the present invention may be practiced.

FIG. 2 is a block diagram of a mobile computing device 130,150 with which embodiments of the present invention may be practiced. Although the communication device shown is a mobile communication device, according to embodiments of the present invention, the communication device may be a wireless communication device 130,150, VoIP-type software phone 140, CATV phone 516, landline phone 135, or any communication device with a capability to present call disposition options to a user, receive commands from the user (e.g., button pressed to send a call to voicemail, etc.), and send commands to a communication switch. Intelligence to mute a called party's voice while he/she is listening in and "screening" a call may be in the communication device/software, or may be implemented in the communication switch. Hereafter, the term communication device will indicate any communication device illustrated in FIG. 1B and any other type of communication device as described above.

Referring now to FIG. 2, the mobile computing device 130, 150 is illustrative of any suitable device, such as a mobile telephone, personal digital assistant (PDA), or handheld computer, operative to send, receive and process wireless communications according to embodiments of the present invention. A display screen 205 is operative for displaying a variety of information such as information about incoming and outgoing communications, as well as, a variety of data and displayable objects, for example, text, alphanumeric data, photographs, and the like.

Data input to the device 130, 150 may be performed via a variety of suitable means, such as, touch screen input via the display screen 205, keyboard or keypad input via a data entry area 210, key input via one or more selectable buttons or controls 215, voice input via a microphone disposed on the device 130, 150, photographic input via a camera functionality associated with the mobile computing device, or any other suitable input means. Data may be output via the device 130, 150 via any suitable output means, including but not limited to, display on the display screen 205, audible output via an associated speaker or connected earphone system, vibration module for providing tactile output, and the like.

Operational unit 220 is illustrative of internal operating functionality of the mobile computing device 130, 150. A processor 225 is illustrative of a general-purpose computer processor for processing incoming and outgoing data and communications and controlling operation of the device and associated software applications via a mobile computing device operating system. Memory 230 may be utilized for storing a device operating system, device programming, one or more stored applications, for example, mobile telephone applications, data processing applications, calculators, games, Internet browsing applications, navigation applications, etc. Radio functions 235 include all required functionality, including onboard antennae, for allowing the device 130, 150 to communicate with other communication devices and systems via a wireless network. As should be appreciated, although the communication device is described above in relation to a mobile phone, the communication device may be any one of various types of communication devices connected to various types of communications networks.

Figure 3:
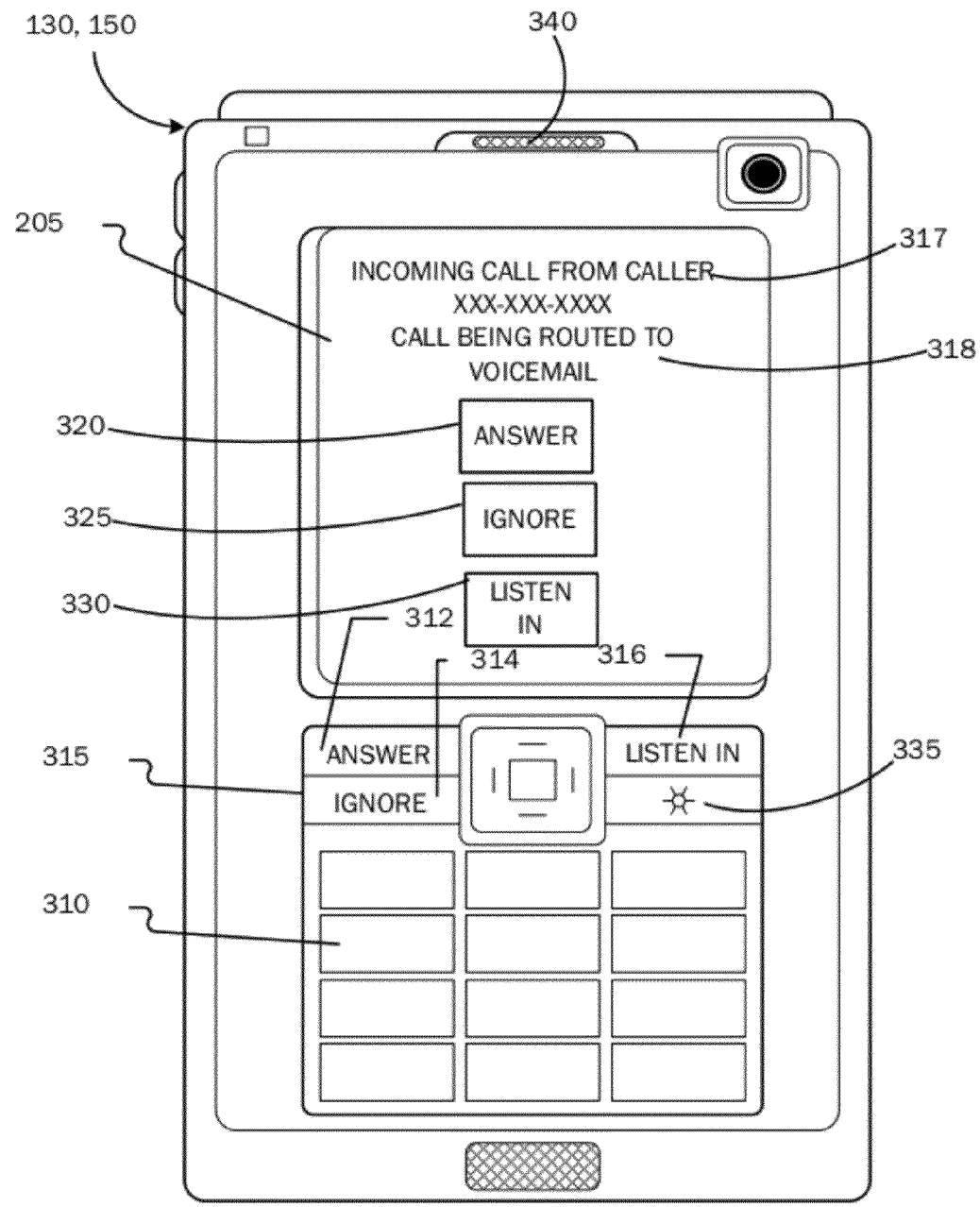
FIG. 3 is a simplified block diagram illustrating a mobile telephone/computing device interface with which embodiments of the invention may be practiced.

Referring now to FIG. 3, a simplified block diagram illustrating a telephone/computing device interface with which embodiments of the invention may be practiced is shown. As illustrated in FIG. 3, a called party's communication device display screen 205 may be utilized for providing information to the called party 152 about the device's applications and functionalities. Additionally, the display screen 205 may be utilized for providing information about incoming and outgoing communications. For example, caller identification information 317 for incoming calls may be displayed on the screen 205, including a name, telephone number, address, and the like for a calling party 132 when an incoming call is being received. In accordance with embodiments of the invention, other information may be displayed, such as a message 318 indicating that a call is being sent to voicemail or that a voicemail recording from a calling party is in progress, etc. Other indications that a call is being sent to voicemail may include an audible indication, such as a beep or tone, from a speaker 340, a flashing or steady light emitted from a light source 335, or a tactile indication, such as a vibration of the called device caused by a vibration module in the called device.

Referring still to FIG. 3, one or more touch screen selectable options may be displayed on the display 205 for allowing the called party 152 to invoke call-screening between a calling 132 and called party. For example, touch screen selectable button 320 may be provided for allowing a user 152 of a communication device to "Answer" an incoming call. Button 325 may be provided for allowing a user 152 of a communication device to "Ignore" the call and to allow the call to go to voicemail. Button 330 may be provided for allowing a user 152 of a communication device to "Listen in" which would send the call to voicemail and simultaneously allow the called party to listen in to the message being deposited into voicemail by the calling party 132. As illustrated in FIG. 3, the aforementioned functionalities (Answer, Ignore and Listen in) may also be activated via hardware buttons 312, 314 and 316 respectively. In addition, the device 130, 150 may be equipped with voice activation technology to allow each of these functions to be activated by voice command. As should be appreciated, the call-screening disposition options illustrated in FIG. 3 are for purposes of example and are not limiting of other options that may be available according to embodiments of the invention.

Having described an exemplary operating environment 100 with respect to FIG. 1 and having described an example mobile communication device 130, 150 with respect to FIG. 2, and having described a communication device user interface with respect to FIG. 3, FIGS. 4A, 4B, 4C, and 4D are flow diagrams showing illustrative routines 400 for monitoring and controlling communications intended for a called party 152.

Figure 4A:
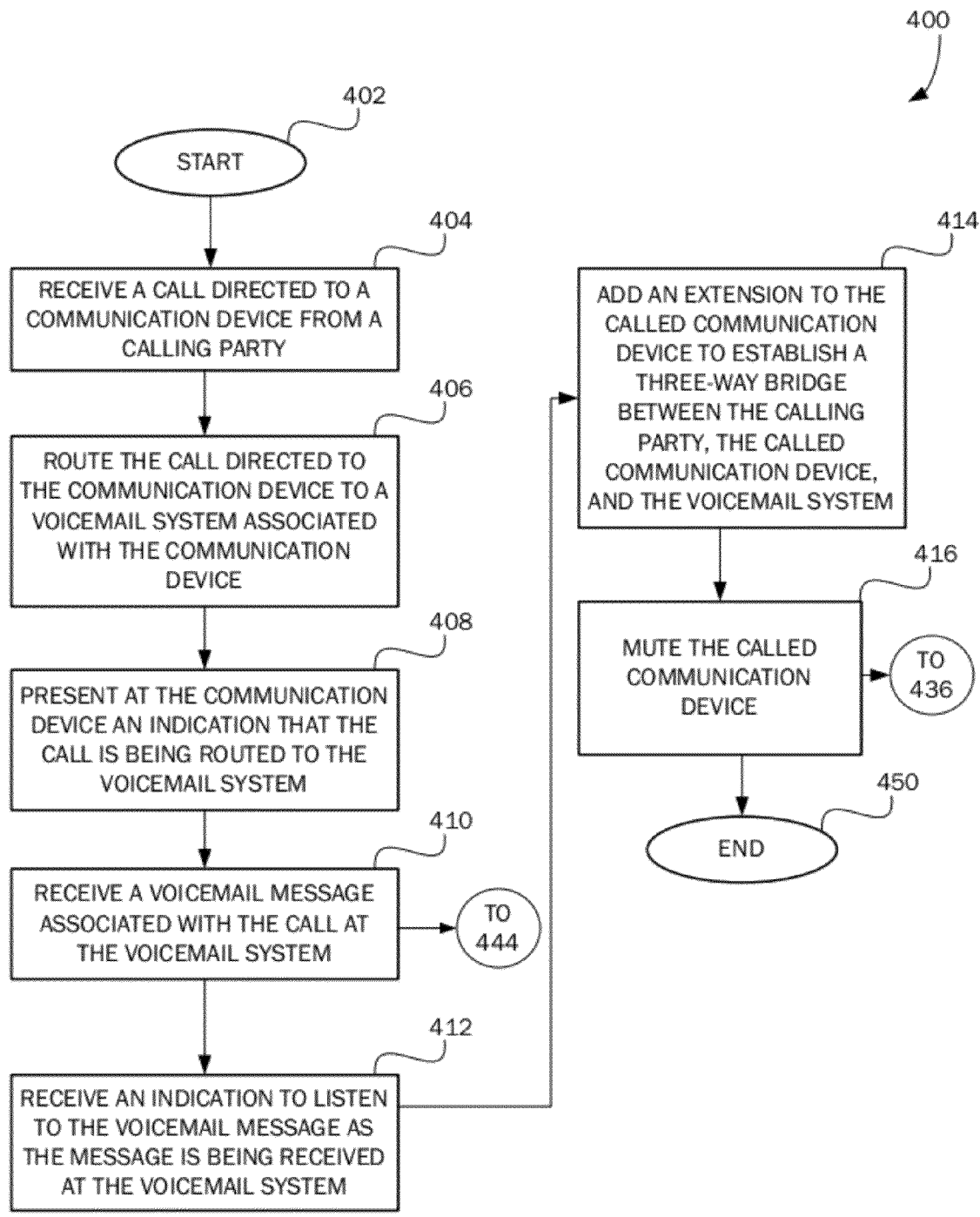
FIGS. 4A-4D are flow diagrams showing illustrative routines for call-screening an incoming voicemail message.

Referring to FIG. 4A, the routine 400 begins at start operation 402 and proceeds to operation 404 where a call directed to a communication device 150 from a calling party 132 is received. An indication of the incoming call may be displayed on the user interface of communication device 150. As should be appreciated the display of the incoming call information may be directed via client side functionality at the device 150 in response to the receipt of an incoming call, or the display of the incoming call information may be sent to the device 150 by the communication switch if the communication switch maintains control of the call until call disposition is resolved, as described below.

At operation 406, the call directed to the communication device 150 is routed to a voicemail system associated with the communication device. As should be appreciated, there may be various possible causes for a call to be routed to a voicemail system. For example, if a user 152 does not answer the call, and if the user's service subscription provides for voicemail, then the user/called party may allow the call to be routed to voicemail to allow the calling party 132 to leave a voicemail message for the called party. As should be appreciated, the user may not be in a position to answer the call, the called device may be in an "off" mode, or the called device may not be in the reach of the called party for answering the incoming call. Alternatively, the called party may direct the incoming call to voicemail by selection of an Ignore button 325, 314. If the called party allows the call to be passed to voicemail, the communication switch may forward the call to the voicemail server where a message may be deposited by the calling party.

According to embodiments of the invention, when a call is being deposited into voicemail by a called party 152, at operation 408, an indication that the call is being routed to voicemail may be provided to allow the called party to know that the call is being routed to voicemail and that deposit of a message to the called party's voicemail box may be in progress. As described above, a text indication 318, an audible indication (e.g., beep or tone from speaker 340), a visual indication (e.g., a flashing or steady light from light source 335), or a tactile indication, such as a vibration of the called device, may be presented to allow the called party to know that a voicemail message is being deposited by a calling party. The method 400 proceeds to operation 410 where a voicemail message associated with the call may be received at the voicemail system.

When the call is passed to voicemail and while a message is being deposited to the called party's voicemail box, the called party 152 may exercise one or more of the call screening functions described herein. At operation 412, an indication to listen to the voicemail message as the message is being received at the voicemail system is received. According to this embodiment, if the called party selects the Listen in button 316, 330 or activates the Listen in function via another means, for example, voice command, then signaling is passed from the called device 150 to the communication switch indicating the called party desires to listen to the voicemail message as it is being deposited by the calling party 132.

At operation 414, the communication switch establishes a three-way bridge between the calling party 132, the called communication device 150, and the voicemail system to allow the called party to listen to the voicemail message as it is being deposited by adding an extension to the communication device 150. At operation 416, the called communication device may be muted to allow for listening-in or screening of the call. According to embodiments, muting the called communication device may include muting a microphone of the called communication device or preventing a called user's 152 signal from being transmitted to a calling party 132 via a stopping of the called user's signal at the base station 112 or communication switch. Muting the microphone of the called communication device 150 may occur via intelligence in the communication device. Alternatively, preventing a called user's 152 signal from being transmitted to a calling party 132 may occur via intelligence in the communication switch or base station. As should be appreciated, the stopping (i.e., muting) and restarting (i.e., unmuting) of a communication device user's signal is well known in the art and will not be described in detail herein.

Figure 4B:
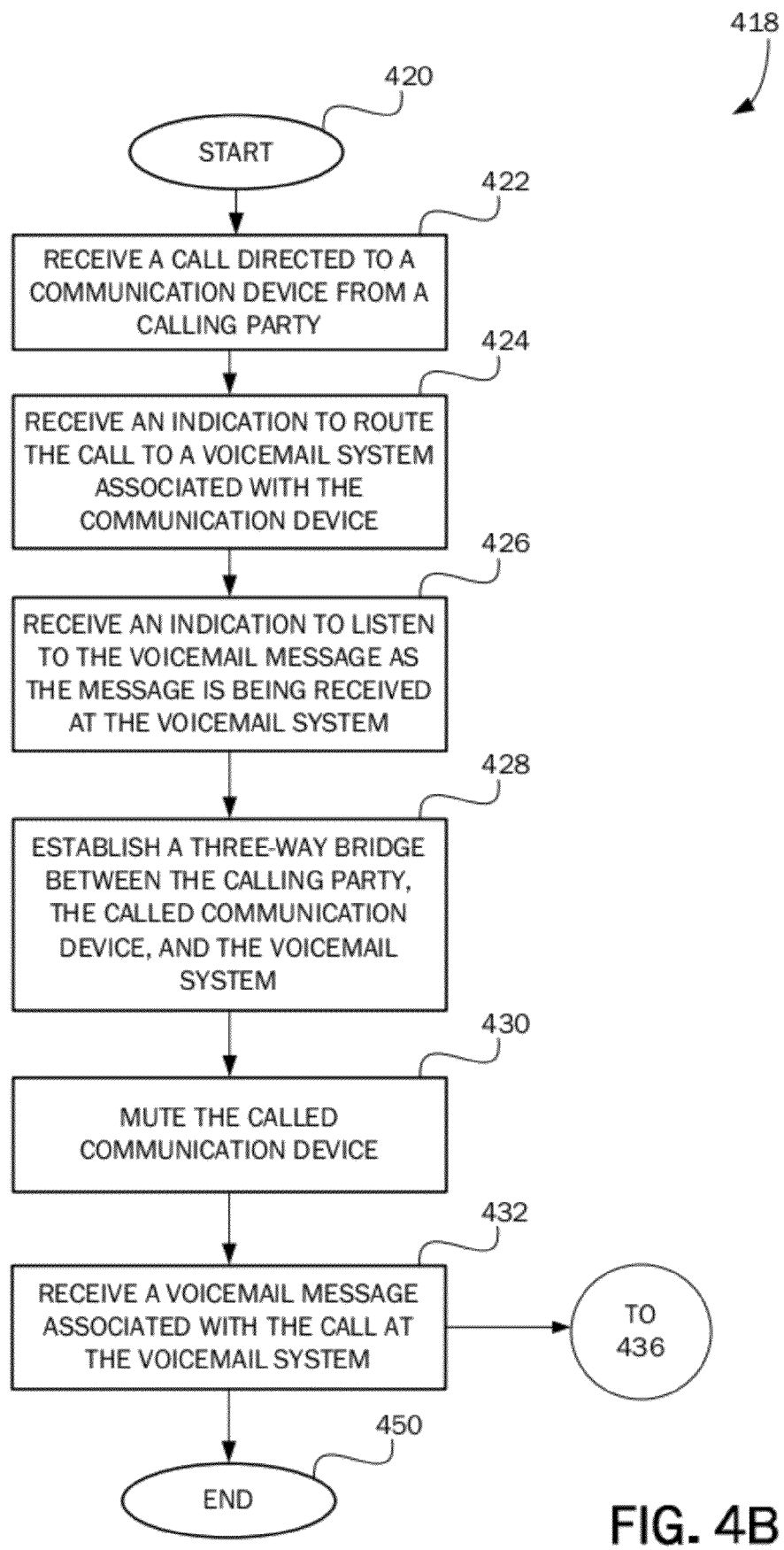
Figure 4C:
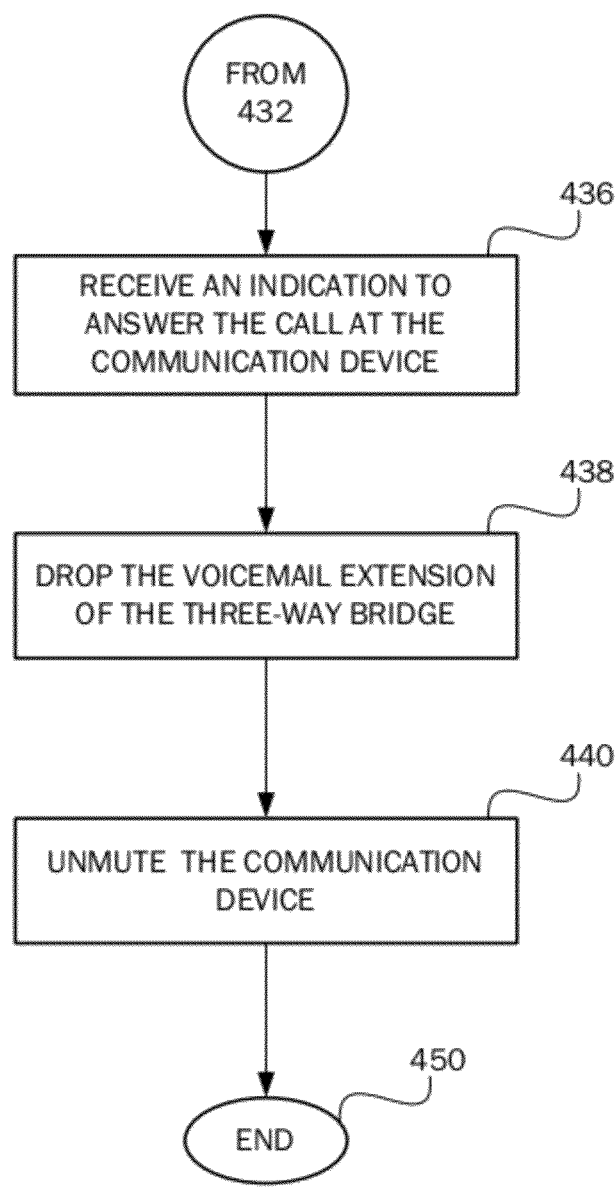

Referring now to FIG. 4B, the routine 418 starts at operation 420, and proceeds to operation 422 where an incoming call to a user 152 of a communication device 150 is displayed on the user interface of communication device 150. As should be appreciated, the display of the incoming call information may be directed via client side functionality at the device 150 in response to the receipt of an incoming call, or the display of the incoming call information may be sent to the device 150 by the communication switch if the communication switch maintains control of the call until call disposition is resolved, as described below.

At operation 424, an indication to route the call directed to the communication device 150 to a voicemail system associated with the communication device is received. As should be appreciated, there may be various possible causes for a call to be routed to a voicemail system as described above with reference to FIG. 4A. If the called party 152 allows the call to be passed to voicemail, the communication switch may forward the call to the voicemail server where a message may be deposited by the calling party.

At operation 426, an indication to listen to the voicemail message as the message is being received as the voicemail system is being deposited. According to this embodiment, the called party 152 may select to route the call to voicemail and listen at the same time, for example, via a selection of a "route call to voicemail and listen in" option.

At operation 428, the communication switch establishes a three-way bridge between the calling party 132, the called communication device 150, and the voicemail system to allow the called party 152 to listen to the voicemail message as it is being deposited. At operation 430, the called communication device may be muted to allow for listening-in or screening of the call. According to embodiments and as described above, the microphone of the called communication device 150 may be muted via intelligence in the called communication device or via intelligence in the communication switch. At operation 432, a voicemail message associated with the call may be received at the voicemail system, and the user 152 may listen to the voicemail message as it is being deposited in the voicemail system.

According to embodiments, while a voicemail message associated with an incoming call is being received at the voicemail system, and the user 152 is listening to the voicemail message as it is being received, at operation 436 (FIG. 4C), the user may decide to answer the call. An indication to answer the call at the communication device 150 may be received. As should be appreciated, the called party may answer the call by selection of the Answer button 312, 320, or via an alternate means including, but not limited to, voice activated command or by opening a "flip" type cover of the called device 150 if the device is so equipped.

After receiving an indication to answer the call at the communication device 150 at operation 436, at operation 438, the extension to the voicemail system of the three-way bridge may be dropped. At operation 440, the microphone of the communication device may be unmuted, and the user 152 may answer the call.

Figure 4D:
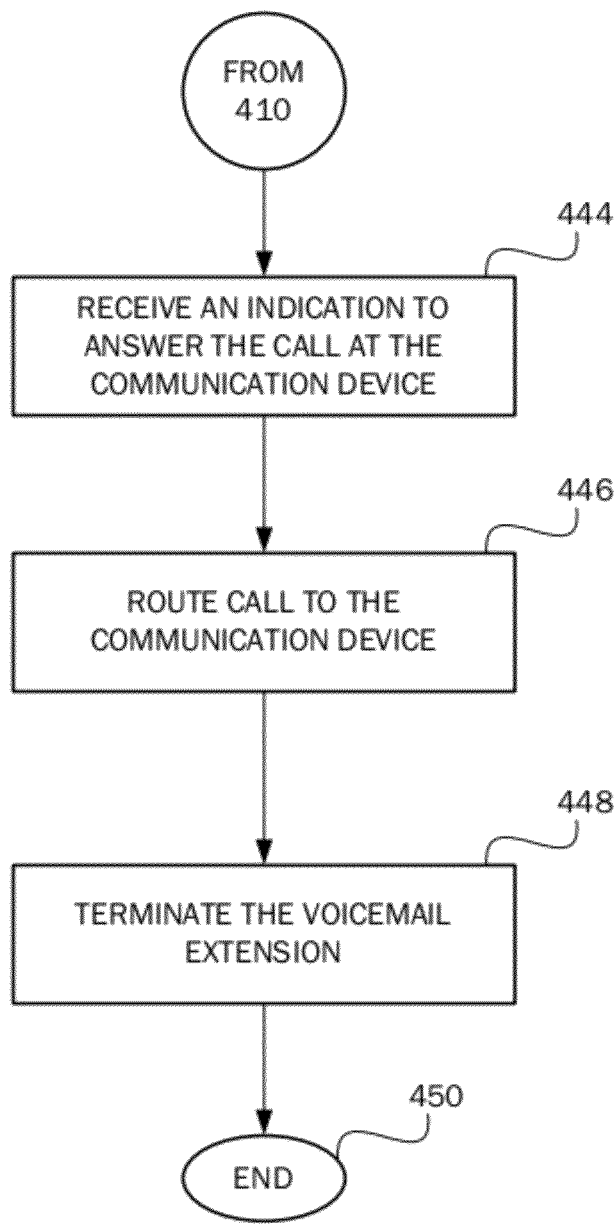

According to embodiments and as shown in FIG. 4D, if the user 152 decides to answer the call while a voicemail message associated with an incoming call is being received at the voicemail system at operation 410, the user may direct the call from the voicemail system to the communication device by selection of an answer option. That is, a user 152 may decide to answer a call while a message is being received by the voicemail system without the user listening in on the message. At operation 444, an indication to answer the call at the communication device may be received.

At operation 446, the call may be routed to the communication device 152. According to embodiments, when a call is forwarded or routed to a voicemail system, the forwarded call continues to traverse the called party communication switch. The inbound extension from the called party 152 continues to come in on an inbound trunk, and the forwarded call leaves through an outbound trunk. Accordingly, the call continues to pass through the switch. Upon selection of an answer option, embodiments of the present invention provide for allowing the user 152 to regain control of the call. At operation 448, the extension to the voicemail system may be dropped. The routine ends at operation 450.

Although described in combination with a mobile telephone/computing device 130, 150 and a MTSO 120, in alternative embodiments, the invention may be used in combination with any number of computer systems, such as in desktop environments, laptop or notebook computer systems, multiprocessor systems, micro-processor based or programmable consumer electronics, network PCs, mini computers, main frame computers and the like. Embodiments of the present invention may be utilized in various distributed computing environments where tasks are performed by remote processing devices that are linked through a communications network in a distributed computing environment.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

As described herein, embodiments of the present invention provide for allowing a user of communication device to exercise one or more call-screening controls. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of allowing call screening of a voicemail message in a telephony system, comprising:
   receiving a call directed to a communication device;
   routing the call directed to the communication device to a voicemail system associated with the communication device;
   querying a database for a UIN or MAC address of a set-top box associated with a user of the communication device;
   presenting, at a display screen at the set-top box, options to answer the call, ignore the call, or to listen to the voicemail message when the call directed to the communication device is routed to the voicemail system associated with the communication device; and
   in response to receiving a selection to listen to the voicemail message received at the voicemail system as the voicemail message is being received at the voicemail system, establishing a three-way bridge between the set-top box, a calling party, and the voicemail system associated with the communication device to allow the user of the communication device to listen to the voicemail message as the voicemail message is being received at the voicemail system.

2. The method of claim 1, further comprising muting the set-top box during the three-way bridge between the set-top box, the calling party, and the voicemail system associated with the set-top box to allow the user of the set-top box to listen to the voicemail message as the voicemail message is being received at the voicemail system without being heard.

3. The method of claim 2, wherein muting the set-top box during the three-way bridge between the set-top box, the calling party, and the voicemail system associated with the communication device includes muting a microphone via intelligence in the set-top box.

4. The method of claim 2, wherein muting the set-top box during the three-way bridge between the set-top box, the calling party, and the voicemail system associated with the communication device includes preventing a signal from the set-top box from being transmitted to the calling party via intelligence in a communication switch.

5. The method of claim 1, further comprising after establishing the three-way bridge between the set-top box, the calling party, and the voicemail system associated with the communication device to allow the user of the set-top box to listen to the voicemail message as the voicemail message is being received at the voicemail system, receiving a selection to answer the call at the set-top box.

6. The method of claim 5, wherein in response to receiving the selection to answer the call at the set-top box, unmuting the set-top box and dropping the voicemail extension of the three-way bridge to allow the user of the set-top box to answer the call as the voicemail message is being received at the voicemail system.

7. The method of claim 1, further comprising receiving a selection to answer the call at the set-top box as the voicemail message is being received at the voicemail system.

8. The method of claim 7, wherein in response to receiving the selection to answer the call at the set-top box, routing the call to the set-top box and terminating the routing of the call to the voicemail system to allow the user to answer the call at the set-top box as the voicemail message is being received at the voicemail system.

9. A method of allowing call screening of a voicemail message in a telephony system, comprising:
   receiving a call directed to a communication device;
   presenting, at a display screen at the communication device, options to answer the call, ignore the call, or to route the call directed to the communication device to a voicemail system associated with the communication device and to listen to the voicemail message as the voicemail message is being received at the voicemail system;
   receiving a selection to route the call directed to the communication device to the voicemail system associated with the communication device and to listen to the voicemail message as the voicemail message is being received at the voicemail system;

in response to receiving the selection to route the call directed to the communication device to the voicemail system associated with the communication device and to listen to the voicemail message received at the voicemail system as the voicemail message is being received at the voicemail system:
  querying a database for a UIN or MAC address of a set-top box associated with a user of the communication device;
  establishing a three-way bridge between the set-top box, a calling party, and the voicemail system associated with the communication device to allow the user of the set-top box to listen to the voicemail message as the voicemail message is being received at the voicemail system; and
  receiving the voicemail message associated with the call at the voicemail system.

10. The method of claim 9, further comprising muting the set-top box during the three-way bridge between the set-top box, the calling party, and the voicemail system associated with the communication device to allow the user of the set-top box to listen to the voicemail message as the voicemail message is being received at the voicemail system without being heard.

11. The method of claim 10, wherein muting the set-top box during the three-way bridge between the set-top box, the calling party, and the voicemail system associated with the communication device includes muting a microphone via intelligence in the set-top box.

12. The method of claim 10, wherein muting the set-top box during the three-way bridge between the set-top box, the calling party, and the voicemail system associated with the communication device includes preventing a signal from the set-top box from being transmitted to the calling party via intelligence in a communication switch.

13. The method of claim 9, further comprising after establishing the three-way bridge between the set-top box, the calling party, and the voicemail system associated with the communication device to allow the user of the set-top box to listen to the voicemail message as the voicemail message is being received at the voicemail system, receiving a selection to answer the call at the set-top box.

14. The method of claim 13, wherein in response to receiving the selection to answer the call at the set-top box, unmuting the set-top box and dropping the voicemail extension of the three-way bridge to allow the user of the set-top box to answer the call as the voicemail message is being received at the voicemail system.

15. A system for allowing call screening of a voicemail message in a telephony system, the system comprising:
  a communications system communication switch operative:
    to receive a call directed to a communication device;
    to route the call directed to the communication device to a voicemail system associated with the communication device;
    querying a database for a UIN or MAC address of a set-top box associated with a user of the communication device;
    to present, at a display screen at the communication device, options to answer the call, ignore the call, or to route the call directed to the communication device to the voicemail system associated with the communication device;
    to receive the voicemail message associated with the call at the voicemail system;
    to receive a selection to listen to the voicemail message received at the voicemail system as the voicemail message is being received at the voicemail system; and
    in response to receiving the selection to listen to the voicemail message received at the voicemail system as the voicemail message is being received at the voicemail system, to establish a three-way bridge between the set-top box, a calling party, and the voicemail system associated with the communication device to allow the user of the set-top box to listen to the voicemail message as the voicemail message is being received at the voicemail system.

16. The system of claim 15, wherein the communications system communication switch is further operative to mute the set-top box during the three-way bridge between the set-top box the calling party, and the voicemail system associated with the communication device to allow the user of the set-top box to listen to the voicemail message as the voicemail message is being received at the voicemail system without being heard.

17. The system of claim 15, wherein the communications system communication switch is further operative to receive a selection to answer the call at the set-top box after establishing the three-way bridge between the set-top box, the calling party, and the voicemail system associated with the communication device to allow the user of the set-top box to listen to the voicemail message as the voicemail message is being received at the voicemail system.

18. The system of claim 17, wherein the communications system communication switch is further operative to unmute the set-top box and drop the voicemail extension of the three-way bridge to allow the user of the set-top box to answer the call as the voicemail message is being received at the voicemail system in response to receiving a selection to answer the call at the set-top box.

19. The system of claim 15, wherein the communications system communication switch is further operative to receive a selection to answer the call at the set-top box as the voicemail message associated with the call is being received at the voicemail system.

20. The system of claim 19, wherein in response to receiving the selection to answer the call at the set-top box, the communications system communication switch is operative to route the call to the set-top box and terminate the routing of the call to the voicemail system to allow the user to answer the call at the set-top box as the voicemail message is being received at the voicemail system.

21. A system for allowing call screening of a voicemail message in a telephony system, the system comprising:
  a communications system communication switch operative:
    to receive a call directed to a communication device;
    to present, at a display screen at the communication device, options to answer the call, ignore the call, or to route the call directed to the communication device to a voicemail system associated with the communication device and to listen to the voicemail message as the voicemail message is being received at the voicemail system;
    to receive a selection to route the call directed to the communication device to the voicemail system associated with the communication device and to listen to the voicemail message as the voicemail message is being received at the voicemail system;
    in response to receiving the selection to route the call directed to the communication device to the voicemail system associated with the communication device and to listen to the voicemail message received at the voicemail system as the voicemail message is being received at the voicemail system:
  querying a database for a UIN or MAC address of a set-top box associated with a user of the communication device;
  to establish a three-way bridge between the set-top box, a calling party, and the voicemail system associated with the communication device to allow the user of the set-top box to listen to the voicemail message as the voicemail message is being received at the voicemail system; and
  to receive the voicemail message associated with the call at the voicemail system.

22. The system of claim 21, wherein the communications system communication switch is further operative to mute the set-top box during the three-way bridge between the set-top box the calling party, and the voicemail system associated with the communication device to allow the user of the set-top box to listen to the voicemail message as the voicemail message is being received at the voicemail system without being heard.

23. The system of claim 21, wherein the communications system communication switch is further operative to receive a selection to answer the call at the set-top box after establishing the three-way bridge between the set-top box, the calling party, and the voicemail system associated with the communication device to allow the user of the set-top box to listen to the voicemail message as the voicemail message is being received at the voicemail system.

24. The system of claim 23, wherein the communications system communication switch is further operative to unmute the set-top box and drop the voicemail extension of the three-way bridge to allow the user of the set-top box answer the call as the voicemail message is being received at the voicemail system in response to receiving a selection to answer the call at the set-top box.

25. A computer readable storage device containing computer executable instructions which when executed by a computer perform a method of allowing call screening of a voicemail message in a telephony system, the method comprising:
  receiving a call directed to a communication device;
  routing the call directed to the communication device to a voicemail system associated with the communication device;
  presenting, at a display screen at the communication device, options to answer the call, ignore the call, or to route the call directed to the communication device to the voicemail system associated with the communication device;
  receiving the voicemail message associated with the call at the voicemail system;
  receiving a selection to listen to the voicemail message received at the voicemail system as the voicemail message is being received at the voicemail system; and
  in response to receiving the selection to listen to the voicemail message received at the voicemail system as the voicemail message is being received at the voicemail system, querying a database for a UIN or MAC address of a set-top box associated with a user of the communication device, establishing a three-way bridge between the set-top box, a calling party, and the voicemail system associated with the communication device to allow the user of the set-top box to listen to the voicemail message as the voicemail message is being received at the voicemail system.

26. The computer readable storage device of claim 25, further comprising muting the set-top box during the three-way bridge between the set-top box, the calling party, and the voicemail system associated with the communication device to allow the user of the set-top box to listen to the voicemail message as the voicemail message is being received at the voicemail system without being heard.

27. The computer readable storage device of claim 26, further comprising after establishing the three-way bridge between the set-top box, the calling party, and the voicemail system associated with the communication device to allow the user of the set-top box to listen to the voicemail message as the voicemail message is being received at the voicemail system, receiving a selection to answer the call at the set-top box.

28. The computer readable storage device of claim 27, wherein in response to receiving the selection to answer the call at the set-top box, unmuting the set-top box and dropping the voicemail extension of the three-way bridge to allow the user of the set-top box to answer the call as the voicemail message is being received at the voicemail system.

29. The computer readable storage device of claim 25, further comprising receiving a selection to answer the call at the set-top box as the voicemail message is being received at the voicemail system.

30. The computer readable storage device of claim 29, wherein in response to receiving the selection to answer the call at the set-top box, routing the call to the set-top box and terminating the routing of the call to the voicemail system to allow the user to answer the call at the set-top box as the voicemail message is being received at the voicemail system.

31. A computer readable storage device containing computer executable instructions which when executed by a computer perform a method of allowing call screening of a voicemail message in a telephony system, the method comprising:
  receiving a call directed to a communication device;
  presenting, at a display screen at the communication device, options to answer the call, ignore the call, or to route the call directed to the communication device to a voicemail system associated with the communication device and to listen to the voicemail message as the voicemail message is being received at the voicemail system;
  receiving a selection to route the call directed to the communication device to the voicemail system associated with the communication device and to listen to the voicemail message as the voicemail message is being received at the voicemail system;
  in response to receiving the selection to route the call directed to the communication device to the voicemail system associated with the communication device and to listen to the voicemail message received at the voicemail system as the voicemail message is being received at the voicemail system:
    querying a database for a UIN or MAC address of a set-top box associated with a user of the communication device;
    establishing a three-way bridge between the set-top box, a calling party, and the voicemail system associated with the communication device to allow the user of the set-top box to listen to the voicemail message as the voicemail message is being received at the voicemail system; and
    receiving the voicemail message associated with the call at the voicemail system.

32. The computer readable storage device of claim 31, further comprising muting the set-top box during the three-way bridge between the set-top box, the calling party, and the voicemail system associated with the communication device to allow the user of the set-top box to listen to the voicemail message as the voicemail message is being received at the voicemail system without being heard.

33. The computer readable storage device of claim 31, further comprising after establishing the three-way bridge between the set-top box, the calling party, and the voicemail system associated with the set-top box to allow the user of the communication device to listen to the voicemail message as the voicemail message is being received at the voicemail system, receiving a selection to answer the call at the set-top box.

34. The computer readable storage device of claim 33, wherein in response to receiving the selection to answer the call at the set-top box, unmuting the set-top box and dropping the voicemail extension of the three-way bridge to allow the user of the set-top box to answer the call as the voicemail message is being received at the voicemail system.

* * * * *